United States Patent [19]
Masahiro

[11] Patent Number: 6,014,913
[45] Date of Patent: Jan. 18, 2000

[54] HOLLOW CRANK SPINDLE UNIT FOR BICYCLES

[75] Inventor: Yamanaka Masahiro, Izumisano, Japan

[73] Assignee: Shimano, Inc., Osaka, Japan

[21] Appl. No.: 08/994,504

[22] Filed: Dec. 19, 1997

[30] Foreign Application Priority Data

Dec. 27, 1996 [JP] Japan .................................. 8-358087

[51] Int. Cl.$^7$ .................................................. F16C 19/08
[52] U.S. Cl. ...................................... 74/594.1; 384/545
[58] Field of Search ........................... 74/594.1, 594.2; 384/545

[56] References Cited

U.S. PATENT DOCUMENTS

| | | | |
|---|---|---|---|
| 3,903,754 | 9/1975 | Morroni | 74/594.1 |
| 4,704,919 | 11/1987 | Durham | 74/594.1 |
| 4,811,626 | 3/1989 | Bezin | 74/594.1 |
| 5,118,205 | 6/1992 | Hoffmann | 384/545 X |

FOREIGN PATENT DOCUMENTS

| | | |
|---|---|---|
| 26 47 424 | 4/1977 | Germany ............... 74/594.1 |
| 404563 | 6/1943 | Italy ....................... 74/594.1 |
| 48-7948 | 1/1973 | Japan . |
| 58-93554 | 6/1983 | Japan . |
| 60-137691 | 9/1985 | Japan . |
| 61-131391 | 8/1986 | Japan . |
| 61-150691 | 9/1986 | Japan . |
| 2-18652 | 4/1990 | Japan . |
| 5-116670 | 5/1993 | Japan . |
| 1546958 | 5/1979 | United Kingdom . |

*Primary Examiner*—Mary Ann Battista
*Attorney, Agent, or Firm*—James A. Deland

[57] ABSTRACT

A crank spindle unit includes a crank spindle having an outer peripheral surface defining a first end, a second end and a hollow central portion. A plurality of first serrations are formed on the first end of the crank spindle, and a plurality of second serrations are formed on the second end of the crank spindle. A first guide surface having a first guide surface diameter is formed on the outer peripheral surface continuously with and inwardly from the plurality of first serrations, and a second guide surface having a second guide surface diameter is formed on the outer peripheral surface continuously with and inwardly from the plurality of second serrations. A first track groove is formed on the outer peripheral surface in proximity to the first end of the crank spindle, wherein a lowermost surface of the first track groove has a first track groove diameter. Similarly, a second track groove formed on the outer peripheral surface in proximity to the second end of the crank spindle, wherein a lowermost surface of the second track groove has a second track groove diameter. A diameter of the central portion between the first track groove and the second track groove is less than the first guide surface diameter and the second guide surface diameter.

18 Claims, 4 Drawing Sheets

HOLLOW CRANK SPINDLE UNIT FOR BICYCLES

BACKGROUND OF THE INVENTION

The present invention is directed to bicycle crank spindles and, more particularly, to a hollow crank spindle for a bicycle.

A bicycle is equipped with crank spindles, hub spindles, and other spindles. Ideally, these spindles should have minimum weight because motive power is provided by human effort. A known technique of weight reduction is to use hollow crank spindles in place of solid ones (e.g, Japanese Laid-Open Utility Model Application 52-60058). In a crank spindle, constant torsional stress and other loads are applied because the crank receives the tread force of the left pedal, captures this force as a torsional torque, and transmits this torque as motive power to the chain via the front chainwheel. This is especially true in cotterless-type cranks wherein the two ends of the spindle have a rectangular cross section to nonrotatably fix the crank arms to the spindle. Unfortunately, when a hollow crank spindle is adopted, increasing the inside diameter of the hollow portion reduces the wall thickness of the corresponding part of the spindle. This, in turn, reduces the strength of the spindle. In order to provide sufficient weight reduction while maintaining strength, it is desirable to increase the outer diameter of the spindle. In addition, the inner bore of a hollow crank spindle should be maximized because of the limitations imposed by boring tools.

The Applicant has already proposed a structure in which the crank spindle and the left and right cranks are joined by serrations formed on the outer peripheral surface of the crank spindle in order to enhance the strength of the joints. This structure is disclosed in Japanese Patent Application 8-46657. The bonding strength of the crank attachments of the hollow crank spindle can be enhanced by increasing the diameter of these attachments.

Unfortunately, the bore diameters of the bottom brackets for supporting crank spindles are standardized. Also, because a crank spindle is supported by rolling elements in the inner bore of the bottom bracket, gaps are needed for the rolling elements and for the fixed cup and the adjusting cup that support the rolling elements. Thus, the diameter of the middle portion of the hollow crank spindles supported in the bottom bracket cannot be increased arbitrarily.

SUMMARY OF THE INVENTION

The present invention is directed to a lightweight and unitized hollow crank spindle unit for a bicycle that maximizes the hollow portion while maintaining strength and the ability to firmly attach crank arms to the spindle. The construction of the spindle also makes it possible to simplify the steps involved in assembling the bicycle.

In one embodiment of the present invention, a hollow crank spindle unit for bicycles includes a crank spindle having an outer peripheral surface defining a first end, a second end and a hollow central portion. A plurality of first serrations are formed on the first end of the crank spindle, and a plurality of second serrations are formed on the second end of the crank spindle. A first guide surface having a first guide surface diameter is formed on the outer peripheral surface continuously with and inwardly from the plurality of first serrations, and a second guide surface having a second guide surface diameter is formed on the outer peripheral surface continuously with and inwardly from the plurality of second serrations. A first track groove is formed on the outer peripheral surface in proximity to the first end of the crank spindle, wherein a lowermost surface of the first track groove has a first track groove diameter. Similarly, a second track groove formed on the outer peripheral surface in proximity to the second end of the crank spindle, wherein a lowermost surface of the second track groove has a second track groove diameter. A diameter of the central portion between the first track groove and the second track groove is less than the first guide surface diameter and the second guide surface diameter.

In a more specific embodiment, the hollow central portion extends beneath the second track groove. The second track groove has a projection that extends into the hollow central portion, and the second track groove diameter is less than the first track groove diameter. A plurality of first rolling elements having a first rolling element diameter are disposed in the first track groove, and a plurality of second rolling elements having a second rolling element diameter are disposed in the second track groove. The first rolling element diameter equals the second rolling element diameter. A shell surrounds the crank spindle, wherein the shell includes a third track groove for engaging the plurality of first rolling elements and a fourth track groove for engaging the plurality of second rolling elements.

DETAILED DESCRIPTION OF THE EMBODIMENTS

Figure 1:
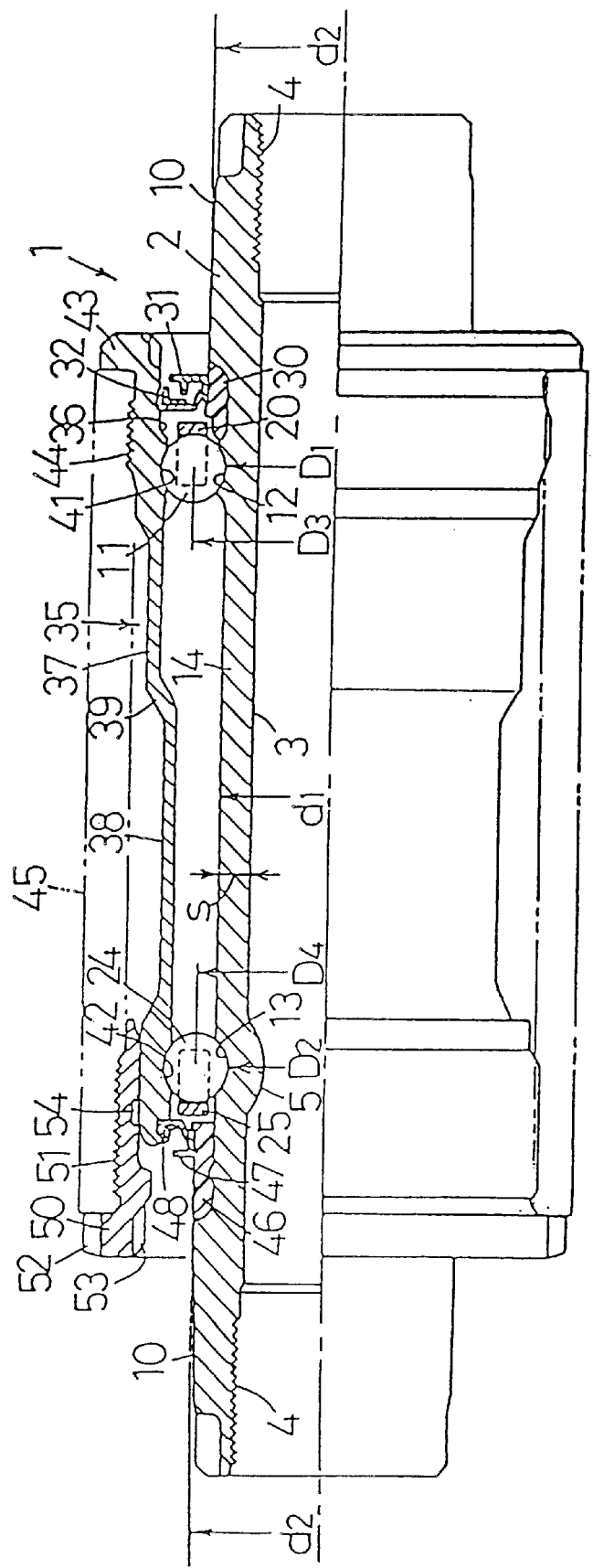
FIG. 1 is a partial cross sectional view of an axle assembly which incorporates a particular embodiment of an expandable bearing retainer according to the present invention.

FIG. 1 is a partial cross sectional view of an axle assembly which incorporates a particular embodiment of an expandable bearing retainer according to the present invention. As shown in FIG. 1, a hollow crank spindle 2 is disposed in the center of a bottom bracket assembly of the bicycle. A through hole 3 is formed in the center of the crank spindle 2, and an internal thread 4 is formed on the inner peripheral surface at the two ends of the through hole 3. The internal thread 4 is designed to threadably accommodate fixing bolts (not shown) for fixing the crank spindle 2 and cranks (not shown).

Figure 2A:
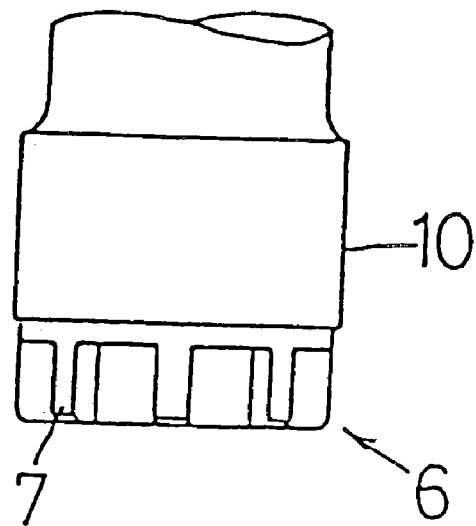
FIGS. 2(b) and 2(b) are detailed and side views, respectively, of an end of the axle shown in FIG. 1.
Figure 2B:
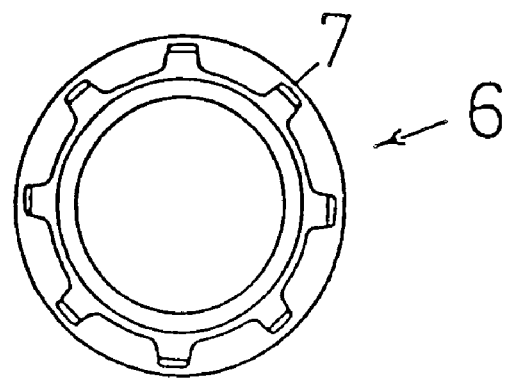

Serrations 6 are formed at the two ends of the crank spindle 2 as shown in more detail in FIGS. 2(a) and 2(b). The serrations 6 are obtained by integrally forming eight projections 7 of angular cross section at isogonal positions in the outer peripheral locations at the two ends of the crank spindle 2. Tapered portions 10 are formed on the outer periphery near the two ends of the crank spindle 2. Tapered portions 10 also may be called guide members because they are linked to the tapered holes of the cranks and flnction as guides during the fixing of the cranks to the crank spindle 2. Crank serrations (not shown) corresponding to the serrations 6 are formed in the crank holes of the crank spindle. Crank serrations and the serrations 6 formed in the crank spindle 2 mesh with each other, and at the same time the tapered portions 10 of the crank spindle 2 come into contact with the tapered inner bore formed coaxially with the crank serrations, thus providing tapered joining. As a result, the crank spindle 2 and the cranks are firmly and concentrically linked by the combined serrated and tapered joining.

A first track groove 12 is integrally formed on the outer peripheral surface of the crank spindle 2. In this embodiment, the first track groove 12 is a groove of circular cross section for supporting seven steel balls 11. The diameter of the bottom portion of the first track groove 12 is designated D1. A second track groove 13 is integrally formed on the outer peripheral surface of the crank spindle 2 at an axial distance from the first track groove 12 for supporting steel balls 24. An inward projection 5 of circular cross section is formed beneath the second track groove 13. The diameter of the bottom portion of the second track groove 13 is designated D2. The diameter D1 of the bottom portion of the first track groove 12 and the diameter D2 of the bottom portion of the second track groove 13 satisfy the relation D1>D2. As a result, a diameter D3 to the centers of balls 11 is greater than a diameter D4 to the centers of balls 24. Also the wall thickness S in the midportion of the crank spindle 2 is reduced in the position corresponding to the second track groove 13 if the projection 5 is absent in the case of a straight through hole 3. Consequently, the projection 5 is shaped in such a way that it extends into the through hole 3, maintaining the required wall thickness.

The midportion 14 of the crank spindle 2 (i.e., the portion between the first track groove 12 and the second track groove 13) has an outer diameter d1, and the largest tapered portions 10 have a diameter d2. The two diameters normally satisfy the relation d2>d1. Of course, the value of d1 is limited because the spindle 2 must be inserted into the inner bore of a standardized bottom bracket.

Figure 3A:
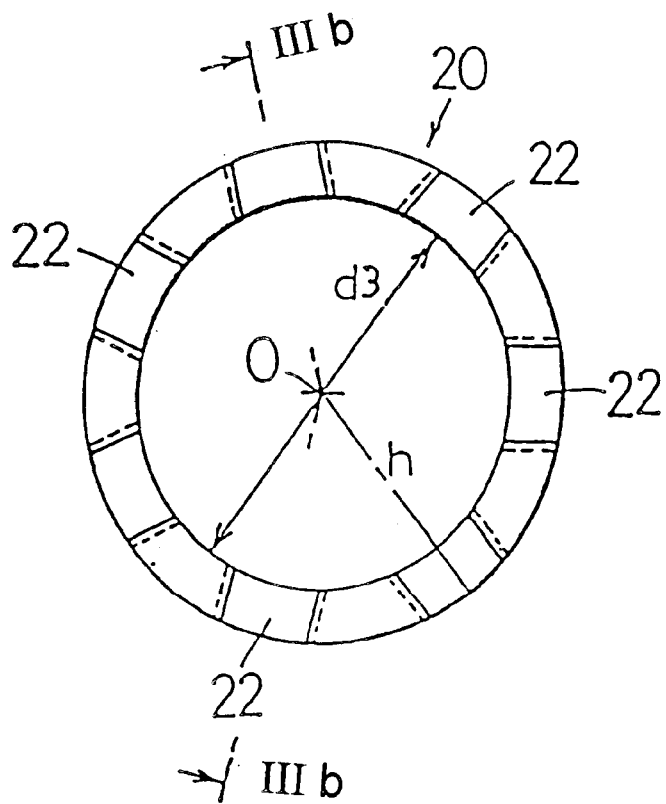
FIGS. 3(a) and 3(b) are front and cross sectional views, respectively of the right side bearing retainer shown in FIG. 1.
Figure 3B:
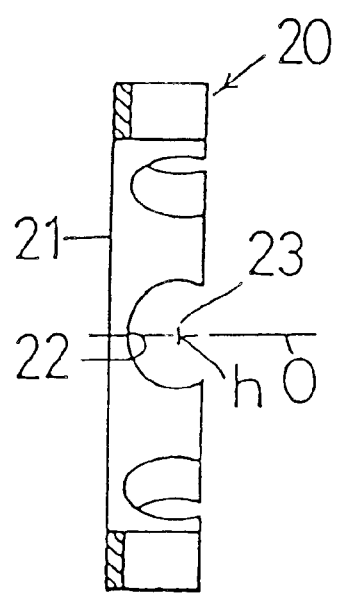
Figure 4A:
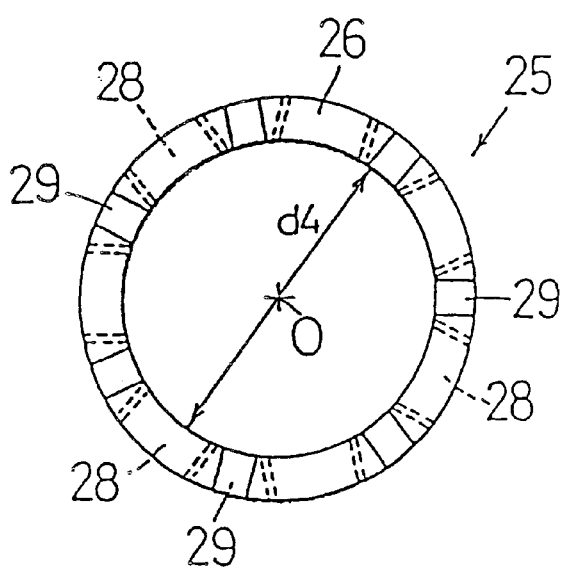
FIGS. 4(a)–4(d) are front, rear, side and cross sectional views, respectively, of a particular embodiment of the left side bearing retainer shown in FIG. 1.
Figure 4B:
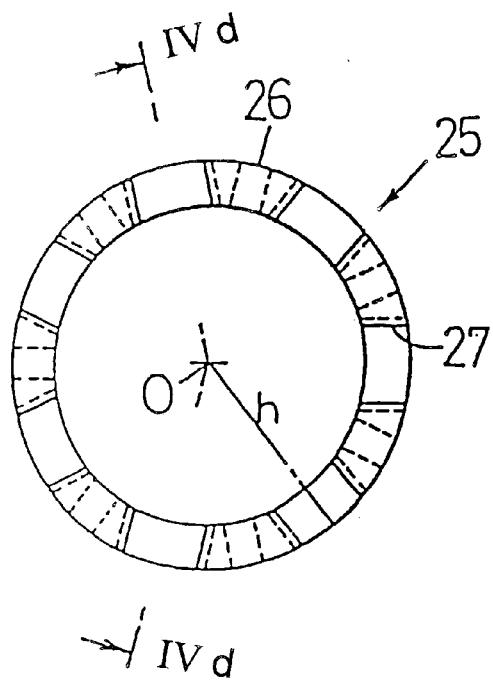
Figure 4C:
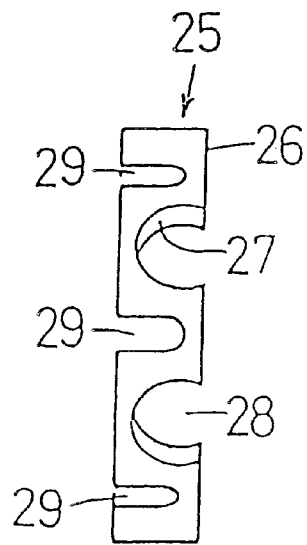
Figure 4D:
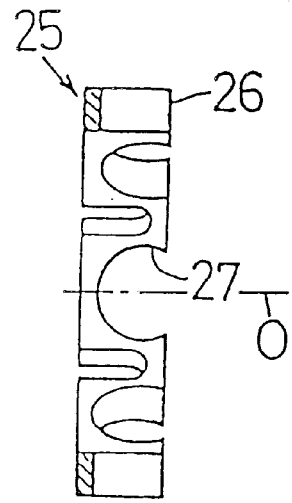

FIGS. 3(*a*) and 3(*b*) are diagrams depicting a first retainer 20 for the steel balls 11, wherein FIG. 3(*a*) is a front view and FIG. 3(*b*) is a cross section of FIG. 3(*a*) taken along line IIIb—IIIb. The first retainer 20 serves to maintain constant intervals between the steel balls 11 of a rolling bearing. The first retainer 20 is annular in shape and is made of the synthetic resin Duran. Seven ball-retaining units 22 are formed at isogonal positions in an annular body 21. The ball-retaining units 22 have partial openings 23 and are centered around a line h orthogonal to the center line O of the body 21. The size of the ball-retaining openings 23 somewhat exceeds the diameter of the steel balls 11 to accommodate their rotation. The seven steel balls 11 are inserted into and retained by the seven corresponding ball-retaining units 22. The inside diameter d3 of the first retainer 20 exceeds the diameter D1 of the first track groove 12 and is greater than the diameter d2 of the largest tapered portions 10. This is because the first retainer 20 cannot be fitted on an end portion of the crank spindle 2 during assembly if the tapered portions 10 are wide. It should be noted, however, that because the first retainer 20 is made of a synthetic resin, it can be stretched somewhat within its limits of elasticity, and the relationship between the diameters of the spindle and the retainer therefore allows the dimensions to be varied within this tolerance range.

FIGS. 4(*a*), 4(*b*), 4(*c*), and 4(*d*) are front, rear, side and cross sectional views, respectively, depicting a second retainer 25 for the steel balls 24. The second retainer 25 serves to maintain a constant interval between the steel balls 24 of the rolling bearing. The second retainer 25 is annular in shape and is made of the synthetic resin Duran. Seven ball-retaining units 27 are formed at isogonal positions in an annular body 26. The ball-retaining units 27 have partial openings 28 and are centered around a line h orthogonal to the center line O of the body 26. The size of the ball-retaining openings 28 somewhat exceeds the diameter of the steel balls 24 to accommodate their rotation. The seven steel balls 24 are inserted into and retained by the seven corresponding ball-retaining units 27. Seven slits 29 are axially disposed at isogonal positions on the back surfaces of the seven ball-retaining openings 28 to form an overall undulating shape of the second retainer 25. Therefore, the formation of the slits 29 allows the second retainer 25 to be extended in the circumferential direction and to be formed to a large diameter.

The inside diameter d4 of the second retainer 25 ordinarily exceeds the diameter D2 of the second track groove 13 but is at least less than the diameter d2 corresponding to a crank spindle 2 with the largest tapered portions 10. Because the diameter D2 of the second track groove 13 is less than the diameter D1 of the first track groove 12, the inside diameter d4 and the outside diameter of the second retainer 25 are less than the inside diameter d3 and the outside diameter of the first retainer 20. Therefore, the slits 29 are formed in view of the fact that the second retainer 25 ordinarily cannot be fitted on the tapered portions 10 of the crank spindle 2 even when this retainer is stretched somewhat within its limits of elasticity. The formation of the slits 29 allows the second retainer 25 to be extended in the circumferential direction and to be formed to a large diameter. A single slit 29 is sufficient, but providing a plurality of slits 29 has the advantage of raising the expansion ratio and of ensuring adaptability to a variety of outside diameters of the spindle.

An annular spacer 30 made of a urethane resin is wound around the crank spindle 2 in the end portion facing the first track groove 12. The material of the spacer 30 is not limited to a urethane resin and can be any other elastic material. A seal guard 31 consisting of Duracon and having an F-shape in its cross section is wound around the outside of the spacer 30. Similarly, an annular spacer 46 made of a urethane resin is wound around the crank spindle 2 in the end portion facing the second track groove 13, and A seal guard 47 consisting of Duracon and having an F-shape in its cross section is wound around the outside of the spacer 46. A rubber seal 32 facing the seal guard 31 is packed along the inner peripheral surface 36 of the inner bore of a shell 35, and a rubber seal 48 facing the seal guard 47 is packed along the inner peripheral surface 36 of the inner bore of the shell 35.

The shell 35 is disposed around the outside between first rolling elements 11 and second rolling elements 24. The shell 35 comprises a large-diameter portion 37 and a small-diameter portion 38, and a ramp 39 is formed between the large-diameter portion 37 and the small-diameter portion 38. A third track groove 41 for rollably accommodating the steel balls 11, and a fourth track groove 42 for rollably accommodating the steel balls 24 are formed in the peripheral surface of the inner bore of the shell 35.

A flange 43 is integrally formed at one end of the shell 35, and an external thread 44 is formed along the outer periphery on the inside of the flange 43. When the external thread 44 of the shell 35 is screwed into the internal thread formed in the inner bore of the bottom bracket 45 of the bicycle, the flange 43 is pressed against the end face thereof and is fixed to the bottom bracket 45.

A roughly cylindrical adaptor 50 is fitted around the outside on the other end of the shell 35. The adaptor 50 is a nut means for fixing the hollow crank spindle unit 1 for bicycles to the bottom bracket 45. An external thread 51 is formed around the outside of the adaptor 50. A groove is formed in the inner peripheral surface of the inner bore of the external thread 51, and a Duracon ring 54 is fixedly inserted into this groove. The inner peripheral surface of the ring 54 is in contact with the outer peripheral surface of the shell 35, thereby fixedly positioning the shell 35 in the bottom bracket 45. A projection 52 designed to be engaged by a spanner at isogonal positions is formed around the outside of the flange of the adaptor 50, and a projection 53 designed to be engaged by a spanner at isogonal positions is formed around the inside of the flange. When the external thread 51 of the adaptor 50 is screwed with the aid of a spanner (not shown) into the internal thread formed in the inner bore of the bottom bracket 45 of the bicycle, the flange is pressed against the end face thereof, and the hollow crank spindle unit 1 is fixed to the bottom bracket 45.

The bottom bracket 45 of a bicycle is attached to the hollow crank spindle unit 1 in the following manner. The hollow crank spindle unit 1 is inserted, with the adaptor 50 removed, into the inner bore of the bottom bracket 45. When the external thread 44 of the shell 35 is screwed with the aid of a spanner (not shown) into the internal thread formed in the inner bore thereof, the flange 43 is pressed against the end face thereof and is fixed to the bottom bracket 45. When the external thread 51 of the adaptor 50 is screwed with the aid of a spanner (not shown) into the internal thread formed in the inner bore of the bottom bracket 45 of the bicycle, the flange is pressed against the end face thereof, and the hollow crank spindle unit 1 is firmly fixed to the bottom bracket 45.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Although the steel balls 11 and 24 pertaining to the embodiment described above had the same diameters, it is also possible for these diameters to be different. In addition, the embodiment described above referred to a projection 5 that extended into the through hole 3 of a crank spindle 2, but this requirement is not always necessary, and a rectilinear through hole may also be used as long as there are no strength-related problems. Thus, the scope of the invention should not be limited by the specific structures disclosed. Instead, the true scope of the invention should be determined by the following claims.

What is claimed is:

1. A hollow crank spindle unit for bicycles comprising:
   a crank spindle having an outer peripheral surface defining a first end, a second end and a hollow central portion;
   a plurality of first serrations formed on an outer peripheral surface of the first end of the crank spindle for meshing with serrations formed on a first crank arm;
   a plurality of second serrations formed on an outer peripheral surface of the second end of the crank spindle for meshing with serrations formed on a second crank arm;
   a first guide surface having a first guide surface diameter formed on the outer peripheral surface of the first end of the crank spindle continuously with and inwardly from the plurality of first serrations;
   a second guide surface having a second guide surface diameter formed on the outer peripheral surface of the second end of the crank spindle continuously with and inwardly from the plurality of second serrations;
   a first track groove formed on the outer peripheral surface of the first end of the crank spindle, wherein a lowermost surface of the first track groove has a first track groove diameter;
   a second track groove formed on the outer peripheral surface of the second end of the crank spindle, wherein a lowermost surface of the second track groove has a second track groove diameter;
   wherein the hollow central portion extends beneath the second track groove;
   wherein the second track groove has a projection that extends into the hollow central portion;
   wherein the hollow central portion extends beneath the first track groove such that an inner peripheral surface of the crank spindle has a constant diameter along an axis of rotation of the crank spindle across an entire width of the first track groove; and
   wherein a diameter of the central portion between the first track groove and the second track groove is less than the first guide surface diameter and the second guide surface diameter.

2. The crank spindle unit according to claim 1 wherein the hollow central portion extends through an entire length of the crank spindle.

3. The crank spindle unit according to claim 1 wherein the second track groove diameter is less than the first track groove diameter.

4. The crank spindle unit according to claim 3 wherein the first track groove diameter is less than the first guide surface diameter and the second guide surface diameter, and wherein the second track groove diameter is less than the first guide surface diameter and the second guide surface diameter.

5. The crank spindle unit according to claim 1 further comprising:
   a plurality of first rolling elements disposed in the first track groove; and
   a plurality of second rolling elements disposed in the second track groove.

6. The crank spindle unit according to claim 5 wherein each of the plurality of first rolling elements has a first rolling element diameter, wherein each of the plurality of second rolling elements has a second rolling element diameter, and wherein the first rolling element diameter equals the second rolling element diameter.

7. The crank spindle unit according to claim 5 further comprising a shell surrounding the crank spindle, wherein the shell includes a third track groove and a fourth track groove, wherein the third track groove engages the plurality of first rolling elements, and wherein the fourth track groove engages the plurality of second rolling elements.

8. The crank spindle unit according to claim 7 further comprising an adaptor fitted on a first end of the shell.

9. The crank spindle unit according to claim 8 wherein the adaptor includes a first flange extending radially outwardly therefrom.

10. The crank spindle unit according to claim 9 wherein the shell includes a second flange disposed on a second end thereof.

11. The crank spindle unit according to claim 7 wherein the second track groove diameter is less than the first track groove diameter.

12. The crank spindle unit according to claim 11 wherein the first track groove diameter is less than the first guide surface diameter and the second guide surface diameter, and wherein the second track groove diameter is less than the first guide surface diameter and the second guide surface diameter.

13. The crank spindle unit according to claim 11 wherein each of the plurality of first rolling elements has a first rolling element diameter, wherein each of the plurality of second rolling elements has a second rolling element diameter, and wherein the first rolling element diameter equals the second rolling element diameter.

14. The crank spindle unit according to claim 13 further comprising an adaptor fitted on a first end of the shell.

15. The crank spindle unit according to claim 14 wherein the adaptor includes a first flange extending radially outwardly therefrom.

16. The crank spindle unit according to claim 15 wherein the shell includes a second flange disposed on a second end thereof.

17. The crank spindle unit according to claim 16 wherein the hollow central portion extends through an entire length of the crank spindle.

18. A hollow crank spindle unit for bicycles comprising:
- a crank spindle having an outer peripheral surface defining a first end, a second end and a hollow central portion;
- a plurality of first serrations formed on an outer peripheral surface of the first end of the crank spindle for meshing with serrations formed on a first crank arm;
- a plurality of second serrations formed on an outer peripheral surface of the second end of the crank spindle for meshing with serrations formed on a second crank arm;
- a first guide surface having a first guide surface diameter formed on the outer peripheral surface of the first end of the crank spindle continuously with and inwardly from the plurality of first serrations;
- a second guide surface having a second guide surface diameter formed on the outer peripheral surface of the second end of the crank spindle continuously with and inwardly from the plurality of second serrations;
- a first track groove formed on the outer peripheral surface of the first end of the crank spindle;
- a plurality of first rolling elements disposed in the first track groove;
- a second track groove formed on the outer peripheral surface of the second end of the crank spindle;
- a plurality of second rolling elements disposed in the second track groove wherein a diameter of the central portion between the first track groove and the second track groove is less than the first guide surface diameter and the second guide surface diameter;

a shell surrounding the crank spindle, wherein the shell includes a third track groove and a fourth track groove, wherein the third track groove engages the plurality of first rolling elements, and wherein the fourth track groove engages the plurality of second rolling elements; and wherein the shell includes a ramp between the third track groove and the fourth track groove for changing an inner diameter of the shell.

* * * * *

UNITED STATES PATENT AND TRADEMARK OFFICE
CERTIFICATE OF CORRECTION

PATENT NO. : 6,014,913
DATED : January 18, 2000
INVENTOR(S) : Masahiro Yamanaka

It is certified that error appears in the above-indentified patent and that said Letters Patent is hereby corrected as shown below:

Inventor's name should read "Masahiro Yamanaka."

Signed and Sealed this

Fifteenth Day of August, 2000

Attest:

Q. TODD DICKINSON

*Attesting Officer*        *Director of Patents and Trademarks*